United States Patent [19]

Fairbanks

[11] Patent Number: 4,608,145

[45] Date of Patent: Aug. 26, 1986

[54] ELECTROPLATING TAPE

[75] Inventor: Norman P. Fairbanks, Cincinnati, Ohio

[73] Assignee: General Electric Company, Cincinnati, Ohio

[21] Appl. No.: 633,742

[22] Filed: Jul. 23, 1984

[51] Int. Cl.[4] ............................................. C25D 17/00
[52] U.S. Cl. .................................................. 204/279
[58] Field of Search ................................ 204/16, 279

[56] References Cited

U.S. PATENT DOCUMENTS

| | | | |
|---|---|---|---|
| 2,391,206 | 12/1945 | Van Der Pyl | 204/16 |
| 3,046,204 | 7/1962 | Barron | 204/16 |
| 3,537,713 | 11/1970 | Matthews et al. | 277/55 |
| 3,537,960 | 11/1970 | Esola | 204/16 |
| 3,980,549 | 9/1976 | Grutza | 204/16 |
| 4,148,494 | 4/1979 | Zelahy et al. | 277/53 |
| 4,169,020 | 9/1979 | Stalker et al. | 204/16 |
| 4,227,703 | 10/1980 | Stalker et al. | 277/53 |
| 4,232,995 | 11/1980 | Stalker et al. | 415/172 A |

Primary Examiner—T. M. Tufariello
Attorney, Agent, or Firm—Lee H. Sachs; Derek P. Lawrence

[57] ABSTRACT

A method for applying preselected abrasive particles to a cleaned first article surface adjacent a second article surface selected to be substantially free of such abrasive particles includes disposing on the first article surface a first electrically non-conductive tape segment including pores large enough to allow passage of electrodeposition current and electrolyte solution but smaller than the size of abrasive particles to be retained on the first tape segment. The first segment has a porous adhesive layer of relatively low tack level, the adhesive carrying the abrasive particles through a first, relatively weak bond. A second electrically non-conductive tape segment substantially impervious to electrolyte solution and electroplating current and having adhesive on a second segment operating surface is disposed on the second article surface in a manner at least sharing an edge portion with the first segment. A metallic coating is electrodeposited through pores of the first tape segment onto the first article surface and about the abrasive particles held in contact with such surface to bond the particles to the first article surface through a second bond. Such bond between the metallic coating and the abrasive particles is stronger than the first, relatively weak bond. The first tape segment is separated at the first bond from the abrasive particles which remain bonded to the first article surface.

An improved electroplating tape is a multisegment electrically non-conductive tape comprising the first tape segment and at least one second tape segment at least sharing an edge portion with the first tape segment.

2 Claims, 6 Drawing Figures

ELECTROPLATING TAPE

This invention relates to the application of abrasive particles to a surface, such as labyrinth seal teeth between stationary and moveable members and, more particularly, to an improved tape and method for using the tape in applying abrasive particles to such a surface.

CROSS-REFERENCE TO RELATED APPLICATION

This application relates to co-pending and concurrently field application Ser. No. 633,741, entitled "Method For Applying Abrasive Particles To A Surface".

BACKGROUND OF THE INVENTION

As is well known in the gas turbine engine art, the efficiency of operation is at least partially dependent on the extent to which compressed fluids such as air or combustion products leak through a clearance space between relatively rotating members. The clearance, for example between a rotating shaft or drum and a stationary support structure, can be designed within specific limits at a given temperature. However, during operation of a gas turbine engine from start up through various operating conditions to shut down, variation in temperatures cause non-uniform thermal expansion or contraction in a complex manner based on such factors as different materials of construction, different configurations, and different masses of materials. A number of reported arrangements have the object of reducing such an undesirable leakage.

One arrangement is described in U.S. Pat. No. 4,148,494—Zelahy, Fairbanks and Maegly, issued Apr. 10, 1979, the disclosure of which is incorporated herein by reference. In such an arrangement, abrasive particles are provided on a projection such as a labyrinth seal tooth to cooperate with a relatively moving, opposed surface, such as a shaft or drum. The abrasive particles, when contacting such opposing surface, are intended to remove material from the surface in order to minimize clearance and reduce leakage between such relatively moving members.

A known method for applying such abrasive particles to a surface or a projection such as a seal tooth is the codeposition of a bonding matrix and particles in an electrolyte bath onto a preselected surface. In one form of such an arrangement, the abrasive particles are suspended in the electrolyte bath and a metal matrix is codeposited with the particles at the selected surface to bond the particles to and entrap the particles at such surface.

Abrasive particles which can be used for such purpose include oxides, nitrides, carbides, silicides, etc. Frequently used types include aluminum oxide, diamond and cubic boron nitride, one form of which is commercially available as Borazon material. Although some of such particles are relatively inexpensive, materials such as diamond and especially Borazon particles are very expensive. Use of known methods can result in a high loss or waste of such expensive materials.

SUMMARY OF THE INVENTION

It is an object of the present invention is to provide a multipurpose electroplating tape for use in depositing the abrasive particles from one segment of the tape while another segment functions as a masking member.

This and other objects and advantages will be more fully understood from the drawings and from the following detailed description and examples, all of which are intended to be representative of rather than in any way limiting on the scope of the present invention.

Briefly, the present invention in one form provides a multi-segment electrically non-conductive electroplating tape for use in a method of applying preselected abrasive particles to a first article surface, the improved method comprised of disposing at the predetermined surface an electrically non-conductive first tape segment carrying the abrasive particles. The first tape segment has pores, voids or openings, herein called pores, large enough to allow passage through the tape of electrodeposition current and electrolyte solution but smaller than the size of the abrasive particles intended to be retained on the first tape segment. Bonding the particles to the first tape segment is an adhesive on an operating surface of the first segment of relatively low tack level and having similar openings, disposed on a tape surface. As used herein, the designation "relatively low tack level" means an adhesion level which creates a bond between the adhesive and a particle weaker than a bond created between the particle and a coating securing the particle to an article surface. The abrasive particles are carried by the adhesive though a first bond. After such disposition of the first tape segment, one or more second tape segments are disposed at edge portions of the first tape segment, for example in abutting or overlapping relationship. This provides a composite, electroplating tape including first and second segments. The second tape segment is substantially impervious to electrolyte solution and electrodeposition current and includes on an operating surface an adhesive to provide a temporary bond with an article surface adjacent the predetermined surface to which the abrasive particles are to be bonded.

After cleaning the article surface, the abrasive particles carried by the first tape segment at its operating surface are held at the article surface. A metallic coating is electrodeposited through pores of the first tape segment and adhesive onto the article surface and about the abrasive particles at the article surface to bond the abrasive particles to the article surface through a second bond, between the metallic coating and the abrasive particles, stronger than the first bond. Thereafter, both segments of the electroplating tape, including the abrasive particles not bonded to the article surface, are separated at the first or weaker bond thereby retaining the bonded abrasive particles at the article surface through the second or stronger bond.

DESCRIPTION OF THE PREFERRED EMBODIMENTS

The present invention is particularly useful in connection with those components operating in the hot sections of a gas turbine engine because of the more extreme differences in rates of thermal expansion and contraction. However, the problems of leakage between relatively moving components can exist in other parts and components of the engine, for example in the compressor, at various seals, etc. Various kinds of seal arrangements to which the present invention relates have been described in the literature, for example in U.S. Pat. No. 3,068,016—Dega, issued Dec. 11, 1962, in the above-identified Zelahy et al patent, in U.S. Pat. No. 3,537,713—Matthews et al, issued Nov. 11, 1970, and elsewhere.

Figure 1:
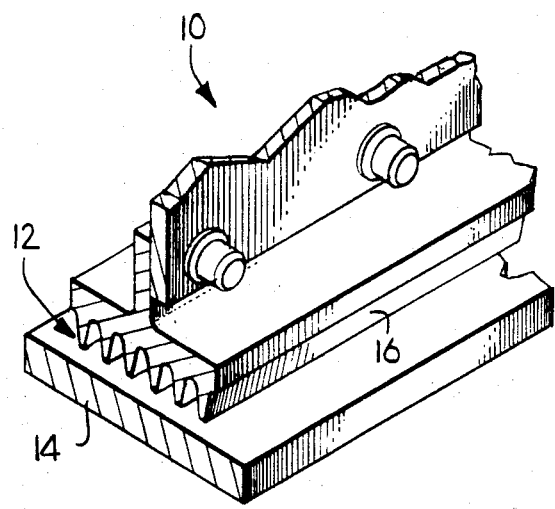
FIG. 1 is a fragmentary, perspective, sectional view of a labyrinth-type rotary seal including rotating teeth cooperating with a stationary opposed member surface.
Figure 2:
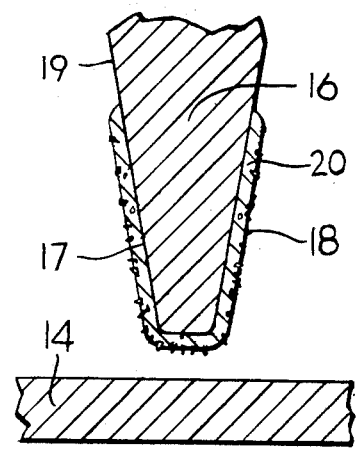
FIG. 2 is an enlarged, fragmentary, sectional view of one of the tooth projections of FIG. 1, including abrasive particles thereon.

The fragmentary perspective view of FIG. 1 is a presentation of one such arrangement. Rotating member 10 includes a plurality of teeth 12 on which it is desirable to apply preselected abrasive particles for cooperation in relative movement with an opposing surface such as a stationary member or shroud 14. This provides a labyrinth seal of a type used in gas turbine engines. The enlarged, fragmentary, sectional view of FIG. 2 shows the tip portion 16 of one such tooth 12 to first article surface 17 of which abrasive particles 1 have been bonded through an electrodeposited bonding coat 20. Adjacent first article surface 17 is a second article surface 19 which is intended to be substantially free of abrasive particles 18.

Figure 3:
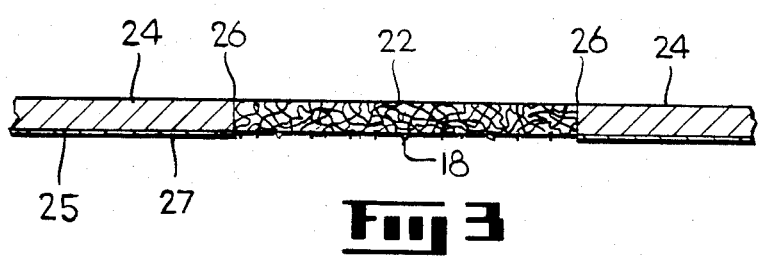
FIG. 3 is an enlarged, sectional view of the multisegment tape of the present invention.
Figure 4:
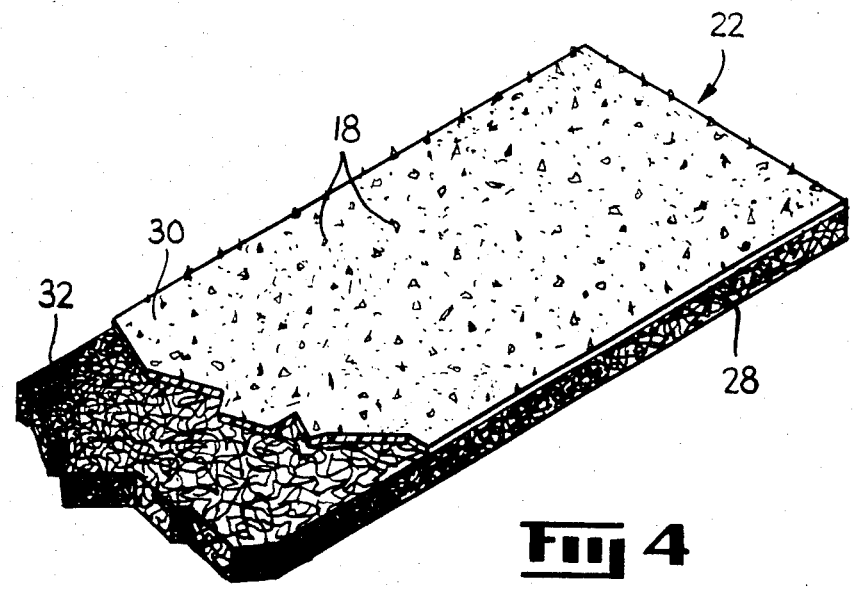
FIG. 4 is an enlarged, fragmentary, sectional, perspective view of the segment of the electroplating tape of FIG. 3 carrying the abrasive particles thereon.

According to one form of the present invention, there is provided an improved electroplating tape shown in FIG. 3. Such electroplating tape comprises a first tape segment 22, shown in more detail in FIG. 4, and at least one second tape segment 24 disposed at edge portions 26 of the first tape segment. For example, it is convenient that second tape segments overlap or abut at such edge portions 26. As shown in FIG. 4, first tape segment comprises an electrically non-conductive tape portion 28, a thin, porous layer of an adhesive 30 of relatively low tack level on an operating surface of tape 28 and a plurality of abrasive particles 18 carried by the adhesive. Such first tape segment can be prepared by sprinkling abrasive particles on the adhesive of the first segment and shaking off excess particles which do not adhere.

Electrically non-conductive tape portion 28 includes pores 32 large enough to allow passage therethrough of electrodeposition current and electrolyte solution but smaller than the size of abrasive particles 18 carried by adhesive 30. The porosity in tape portion 28 can result from that tape portion being made of a non-woven fabric or matte of electrically non-conductive fibrous material to enable the passage of electrodeposition current and electrolyte therethrough. Other forms can be more formal weaves of fibers, mechanically induced porosity, etc. A preferred form of such a porous tape is one commercially available from 3M Company as Scotch brand No. YR-394 vent tape. Such a tape is a flexible, non-woven fabric of a blend of textile fibers which includes thereon a thin, porous layer of synthetic elastomer adhesive of a low tack level of 1-2 oz. adhesion to steel per inch of width as tested by American Society of Testing Materials (ASTM) test D-3330. Flexibility in the tape is preferred for those applications, such as to seal teeth 12, in which it is desirable to have the tape follow the contour of a curved or more complex shaped surface. However, it should be understood that for applications to more planar or less complex surfaces, a more rigid, porous, electrically non-conductive product can be used as the "tape".

As was mentioned, adhesive 30 of first segment 22 is porous to allow the passage of electrodeposition current and electrolyte solution. Also, it has a tack level sufficiently low to allow removal of the tape and adhesive from particles 18 after the particles have been bonded to an article surface, such as of tooth tip portion 16 in FIG. 2, through an electrodeposited coating. The commercially available Scotch brand tape No. YR394 includes such a porous adhesive layer on a surface.

As has been described above, the electrically non-conductive first tape segment incorporated or used in the present invention and shown in FIG. 4 comprises an electrically non-conductive tape having pores large enough to allow passage therethrough of electrodeposition current and electrolyte solution but smaller than the size of the abrasive particles on the tape. The tape of the first segment has a porous adhesive layer of relatively low tack level on a tape operating surface. The first segment includes abrasive particles carried by the adhesive through a bond, herein called a first bond, which is intended to be weaker than a subsequently generated bond between a metallic coating and the abrasive particle. Such a subsequent bond is referred to herein as a second bond.

The second tape segment or segments of the improved electroplating tape of FIG. 3 is electrically non-conductive and is substantially impervious to electrolyte solution and electroplating current. Therefore, in electroplating, it can function as a masking tape and, conveniently, it can be ordinary, commercially available electroplaters masking tape, two forms of which are sold as Flormel #216 and 3M #851 tape. An operating surface 25 of the second tape segment, intended to cooperate with that surface of the first tape segment carrying the abrasive particles in adhering to an article surface, includes a pressure sensitive type adhesive 27 to hold the second segment releasably to an article surface.

According to practice of one form of the method of the present invention, a gas turbine engine annular labyrinth seal member of a nickel base alloy sometimes referred to as Rene' 95 superalloy, more fully described in U.S. Pat. No. 3,576,681—Barker et al, issued Apr. 27, 1971, was involved and included seal teeth 12 as described above in FIG. 1. The seal teeth 12, particularly at the tip portions 16 in FIG. 2, were cleaned to enable adherence of a subsequently electrodeposited metallic coating. Such cleaning can include mechanical abrasion such as through a vapor or air blast type process employing or liquid carried abrasive particles impacting the surface. In this example, vapor blasting was used followed by water flushing and air drying. Other cleaning methods which can be used include ultrasonic water rinsing, electrolytic cleaning for example in acid baths to anodically or cathodically clean the article surface, etc. Selection of such state of the art cleaning method, involving one or more combinations of steps, can be made according to the condition and type of article surface to which the abrasive particles are to be applied.

Figure 5:
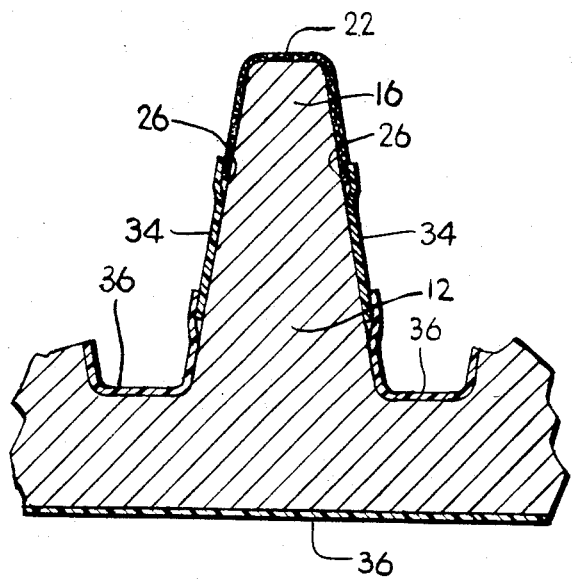
FIG. 5 is a fragmentary, sectional view of a portion of the labyrinth seal of FIG. 1 prepared for further processing according to the method of the present invention.

After cleaning the surface of teeth 12, first tape segments 22, of 3M vent tape No. YR-394 carrying Borazon cubic boron nitride abrasive particles, as described in connection with FIG. 4, were placed about tip portions 16 of teeth 12, as is shown in FIG. 5. Particles 18 and adhesive 30 were facing and placed into contact with the tooth surface, as by pressing. First segment 22 also extended circumferentially about the tip portions 16 of teeth 12 in member 10. Then a pair of second tape segments 34 in the form of commercial electroplaters' tape, as described above, were placed with their adhesive against the surface of teeth 12 and at least sharing an edge portion 26, and preferably overlapping, first tape segment 22, as shown in FIG. 5. This application of second tape segments 34 held the edge portions 26 of the first tape segment and masked portion of teeth 12 away from tip portion 16. Thereafter, a masking lacquer 36, commonly used in the electroplating art and commercially available as Micro Shield stop off material, was applied to the remainder of the annular labyrinth seal member 10, although other kinds of masking used in the electroplating art can be used. In this way, the member 10 was prepared for introduction into an electroplating system for bonding of particles 18 to tip portion 16.

This arrangement, in which the abrasive particles 18 carried by adhesive 30 on first tape segment 22 are held at the tooth surface as shown in FIG. 5, enables electrodeposition of a metallic coating through pores in the first tape segment and its adhesive onto the tooth surface and about the abrasive particles at the tooth surface. This coating bonds the abrasive particles to the tooth surface through a second bond. Such bond is generated between the metallic coating and the abrasive particles, and is stronger than the first bond existing between the particles and adhesive.

Figure 6:
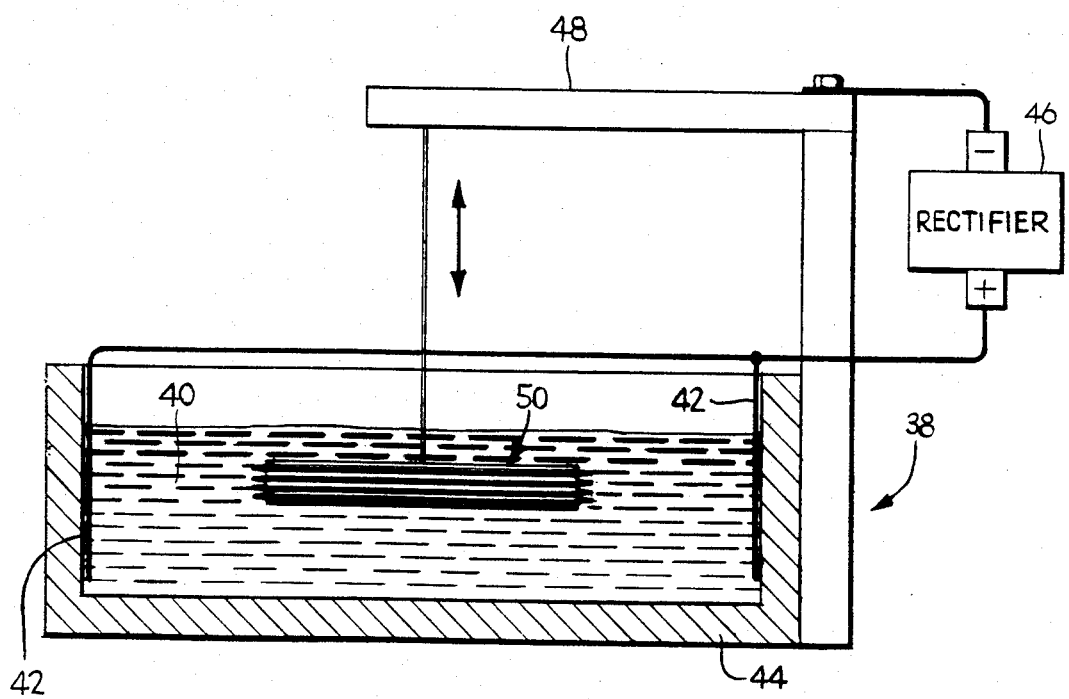
FIG. 6 is a diagrammatic, partially sectional view of one form of the method of the present invention in operation in an electroplating system.

The electrodeposition system used in this example is shown in the diagrammatic view of FIG. 6. The electrodeposition system 38 was provided with an electrolyte 40 and anodes 42 within electrolyte tank or container 40. The system included a direct current power source, such as rectifier 46, the positive side of which was connected with anodes 42. The negative side of the power source was connected through a movable support member 48 to an electrically conductive article, in this example the turbomachinery labyrinth seal member shown generally at 50.

The seal, cleaned and prepared as described above, was immersed and held in the electrolyte solution 40, as shown in FIG. 6, with the abrasive particles 18 in contact with tooth tip portion 16. When seal 10 was connected with the negative side of rectifier 46 and appropriate electroplating current was applied, seal 10 became the cathode which cooperated with anodes 42 under electrolyte 40 to electrodeposit the metallic coating from the electrolyte bath about the abrasive particles to provide the second bond described above. Because the second bond was stronger than the first bond between the particles and the adhesive, subsequent separation of tooth tip portion 16 from contact with first tape segment 22, as by peeling away, withdrew from the first tape segment those particles bonded to the tooth surface through the electrodeposited metallic coating. In this way, the abrasive particles were applied to an article surface.

The abrasive particles remaining on first tape segment 22 and not bonded to a tooth surface were then recovered from the first tape segment for reuse. Such recovery was accomplished by burning away the first tape segment and its adhesive in a furnace. As was mentioned before, practice of the present invention which enables use of a relatively thin layer of expensive abrasive particles is a significant improvement over known methods of placing an article surface such as of tip portion 16 of tooth 12 in contact with a suspension of a significantly larger number of particles in the electrolyte in an electrolyte tank.

Although a single electrodeposited metallic coating has been described in the above example, it should be understood that subsequent additional deposition of metal can be applied about the particles thus bonded to a surface such as the surface of tip portion 16. This can be accomplished by additional electrodeposition of coatings, application of metal particles as through various spraying or vapor deposition techniques, etc.

After deposition according to the present invention of the desired amount of material about abrasive particles 18 bonded to an article surface, the various masking materials were removed. These included second tape segments 34 and lacquer 36.

In another form of the method of the present invention, the article surface such as of tooth 12, after cleaning, can be further prepared such as to provide a surface more receptive to electrobonding of abrasive particles as described above. Such preparation can include such techniques as electroplating "strike" coatings, vapor deposition coatings, etc. In this form of the method of the present invention, the above-described electrodeposition of the second bond metallic coating can be applied to the prepared, coated surface rather than directly to the bare article surface.

Used for generating the metallic bonding in the electrodeposition system of this example was a nickel chloride type electrolyte which included boric acid and a wetting agent. The electrolyte covered the entire annular labyrinth seal as shown in FIG. 6. Electrodeposition current at a current density of about 0.1 amp per square inch was applied to electrodeposit nickel as a coating onto the unmasked surface of the teeth and about the abrasive particles in contact with such surface. This bonded the particles to such preselected surface of the seal teeth. After such electrodeposition to the desired thickness, the seal member was removed from the electrodeposition system by withdrawing it from tank 44. Then the first and second tape segments can be peeled from teeth 12, although generally it is preferable to remove only the first tape segment with the particles at this point and apply additional coating as described below. Because the bond between the particles and the teeth was stronger than the bonded between the particles and the electrically non-conductive first tape segment, abrasive particles adhered to the teeth rather than remaining with the tape segment. Thereafter the masking lacquer was removed.

In this example, preferably it was desirable to apply an additional coating about the particles for a heavier, more secure bond. Therefore, after deposition of the nickel electroplate coating from the nickel chloride solution, the first tape segment was removed. Then the seal member 10 carrying the abrasive particles on the teeth tip portions was immersed in an electrodeposition system including an electrolyte of the nickel sulfamate type including nickel metal, boric acid, and a wetting agent. Other types or combinations of types of electroplate or other coatings can be used. In this specific example, additional nickel electroplate was applied at a current density of about 0.4 amps per square inch after which seal member was removed from the plating bath and rinsed. Then all masking materials, including the second tape segments and the masking lacquer, were removed.

Another example of practice of the method of the present invention uses the improved electroplating tape of the present invention, described above particularly in connection with FIGS. 3 and 4. With such tape, the first and second segments are applied together and the masking lacquer subsequently is applied.

In still another example, after cleaning, the entire tip portion of the tooth first is covered with electroplaters' tape. Then the electroplaters' tape is removed selectively to expose the surfaces to which abrasive particles are to be bonded and such surfaces are covered with the first tape segment as described above.

A further example includes preparation of the seal teeth as described above in connection with FIG. 5 except that, prior to application of lacquer 36, a cover member is placed over first tape segment 22. Such a cover member can be a tape with adhesive only on edge portions to enable it to be bonded to second tape segments 34 but not to first tape segment 22. The seal member 10 is then dipped in masking lacquer. After the lacquer is dry, the cover member is removed exposing the porous first tape segment for subsequent processing in the electroplating system as described above.

The present invention has been described in connection with specific examples and embodiments. However, it will be readily understood by those skilled in the art, particularly the art of electrodeposition, the variations and modifications of which the present invention is capable without departing from its scope defined by the appended claims.

What is claimed is:

1. A multisegment electrically non-conductive electroplating tape for carrying abrasive particles on a surface thereof, comprising:

a first electrically non-conductive tape segment,
   (a) having pores large enough to allow passage therethrough of electrodeposition current and electrolyte solution but smaller than the size of abrasive particles to be retained on the first tape segment;
   (b) a porous adhesive layer of relatively low tack level on a first segment operating surface; and
   (c) abrasive particles carried on the first tape segment operating surface by the adhesive;

at least one second electrically non-conductive tape segment,
   (a) being substantially impervious to electrolyte solution and electrodeposition current,
   (b) including on a second segment operating surface intended to cooperate with the first segment operating surface an adhesive sufficiently strong to hold the second tape segment releasably at an article surface, and
   (c) at least sharing an edge portion with the first tape segment.

2. The tape of claim 1 in which the first segment is flexible.

* * * * *